UNITED STATES PATENT OFFICE.

RUDOLPH BERENDES, OF ELBERFELD, GERMANY, ASSIGNOR TO FARBENFABRIKEN VORM. FRIEDR. BAYER & CO., OF ELBERFELD, GERMANY, A CORPORATION OF GERMANY.

ALKYLOXYACETYL COMPOUND OF PYROCATECHINMONOETHYL ETHER.

No. 822,339. Specification of Letters Patent. Patented June 5, 1906.

Application filed March 31, 1906. Serial No. 309,096.

*To all whom it may concern:*

Be it known that I, RUDOLPH BERENDES, doctor of philosophy, chemist, a citizen of the German Empire, residing at Elberfeld, Germany, Kingdom of Prussia, have invented new and useful Improvements in Alkyloxyacetyl Compounds of Pyrocatechin ethers, of which the following is a specification.

My invention relates to the production of new pharmaceutical products, which are chemically alkyloxyacetyl compounds of pyrocatechinmonoalkyl ethers, such as guaiacol, creosol, pyrocatechinmonoethyl ether or the like, and which according to my researches possess valuable therapeutic properties, especially for the treatment of tuberculosis, and the absence of any odor, their freedom from irritation, non-toxicity, and ability of being easily reabsorbed render their outward application highly satisfactory, an average dose being between one to three grams for one external application.

The process for producing the new compounds consists in treating the above-mentioned pyrocatechinmonoalkyl ethers with alkyloxy acetic acids or derivatives thereof, such as ethoxy or methoxy acetic acid, ethoxyacetyl chlorid, or the like, in such manner as to produce esterification. The new products thus produced are colorless liquids soluble in alcohol and ether. When reacted upon by dilute caustic alkalies they are split up into alkyloxy acetic acid and the corresponding pyrocatechinmonoalkyl ether.

In carrying out my process practically I can proceed as follows, the parts being by weight: One hundred and twenty-four parts of guaiacol and forty parts of caustic soda are dissolved in one thousand parts of water, and to the resulting solution one hundred and twenty-two and one-half parts of ethoxyacetyl chlorid are added. After the chlorid has entered into reaction the mixture is shaken with ether, which will extract the new ester. The ethereal solution is then separated from the water, shaken with highly-dilute caustic soda to remove unchanged guaiacol, and dried. The ether is driven off and the residue is distilled *in vacuo*.

The new compound thus obtained having the formula:

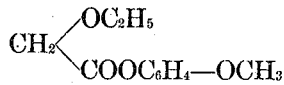

is a limpid oil which boils at 150° centigrade under a pressure of about ten millimeters. It is easily soluble in alcohol and ether and is split up into ethoxy acetic acid and guaiacol when reacted upon by dilute caustic alkalies.

The process is carried out in an analogous manner on using other alkyloxy acetic acids or derivatives thereof, such as methoxy acetic acid, methoxy acetyl chlorid, or other pyrocatechinmonoalkyl ethers, such as creosol, pyrocatechinmonoethyl ether, &c.

Having now described my invention and in what manner the same is to be performed, what I claim as new, and desire to secure by Letters Patent, is—

1. The herein-described new alkyloxy acetyl compounds of pyrocatechinmonoalkyl ethers, obtainable by the action of alkyloxy acetyl chlorid on pyrocatechinmonoalkyl ethers, being colorless liquids soluble in ether and alcohol; liberating the phenol compound when reacted upon by dilute caustic alkalies and exhibiting valuable therapeutic properties, substantially as hereinbefore described.

2. The herein-described new ethoxy acetyl guaiacol having the above-given formula, obtainable by the action of ethoxy acetyl chlorid on guaiacol, and being a limpid colorless oil boiling at 150° centigrade under a pressure of about ten millimeters; being soluble in alcohol and ether; being split up into guaiacol and ethoxy acetic acid when reacted upon by dilute caustic alkalies; and exhibiting valuable therapeutic properties, substantially as hereinbefore described.

In testimony whereof I have hereunto set my hand in the presence of two subscribing witnesses.

RUDOLPH BERENDES.

Witnesses:
OTTO KÖNIG,
ARTHUR MATTHÄUS.